Patented Nov. 11, 1930

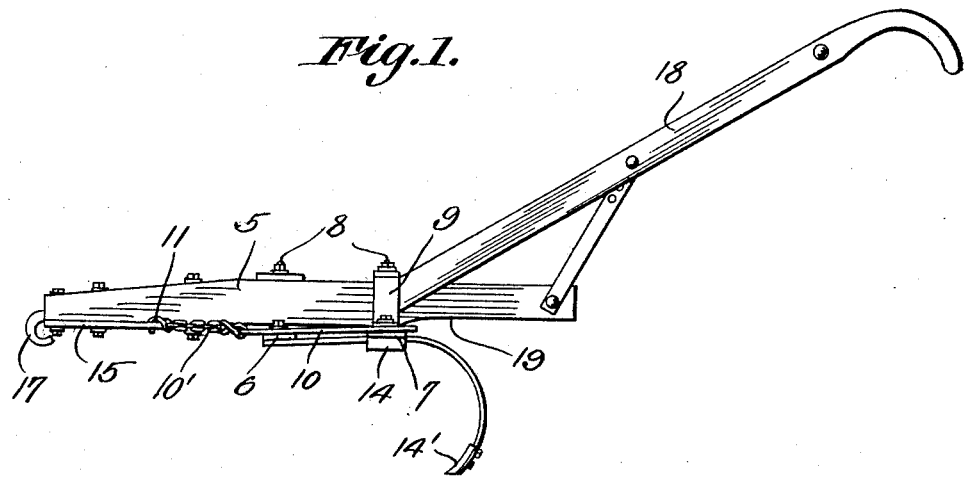
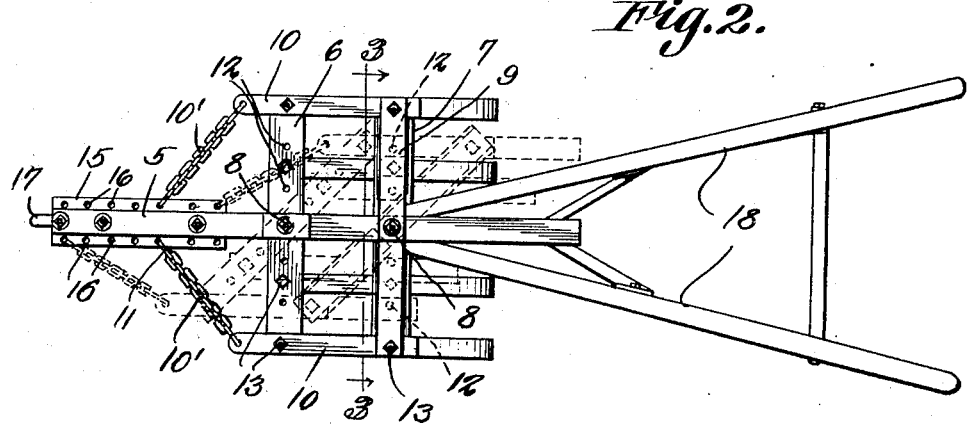
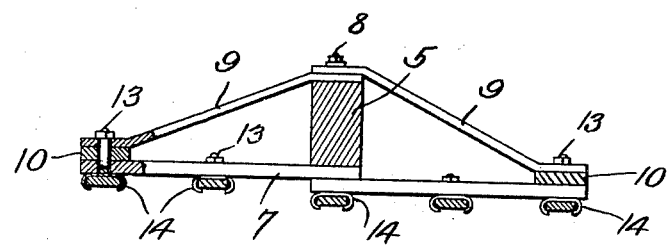

1,781,459

UNITED STATES PATENT OFFICE

HENRY HEITMUELLER, OF CULLMAN, ALABAMA

HARROW

Application filed January 6, 1928. Serial No. 244,920.

This invention has reference to harrows and more particularly harrows of the spring tooth type.

The primary object of the invention is to provide a harrow of this character including a plurality of spring teeth mounted on a pivoted frame, the frame being constructed so that it may be readily and easily adjusted, to the end that the spring teeth may operate at various angles.

A further object of the invention is to provide a harrow, which may be made wider or narrower at the will of the operator, thereby adapting the harrow for various usages.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of the harrow,

Figure 2 is a plan view thereof and showing the harrow in dotted lines in an adjusted position, Figure 3 is a sectional view taken on line 3—3 of Figure 2.

Referring to the drawing in detail, the reference character 5 designates the supporting beam that supports the harrow frame.

The harrow frame embodies lateral sections comprising front members 6 and rear members 7, each section embodying bars pivotally connected at their inner ends by means of the bolts 8, that also pass through the beam 5 to secure the harrow frame thereto.

The reference character 9 designates brace bars that extend from the outer ends of the pivoted bars, the inner ends thereof being overlapped and secured to the beam by the bolt 8 shown as extending through the beam. The forward and rear bars 6 and 7 are pivotally connected at their outer ends by means of bars 10 that have their forward ends extended beyond the forward bar 6 where they are supplied with openings to accommodate the chains 10' supplied with hooks 11 at their forward ends, for purposes to be hereinafter more fully described.

As clearly shown by Figure 2, the bars 6 and 7 are supplied with openings 12 arranged in spaced relation with each other throughout the lengths of the bars which openings accommodate the bolts 13 that secure the spring teeth of the harrow to the pivoted harrow frame.

The bolts that connect the harrow teeth to the rear bar of the harrow are provided with heads embodying spaced flanges 14 between which the teeth of the harrow move, it being understood that these flanges are bent inwardly to contact with the under surfaces of the teeth to hold the teeth against displacement.

The ground engaging ends of the teeth are supplied with shovels 14', however it is to be understood that these shovels may be removed and replaced by plow shares for turning furrows. Secured to the under surface of the beam 5 is an elongated plate 15 that is provided with a plurality of openings 16 arranged in spaced relation with each other, on opposite sides of the beam 5, the openings being designed to accommodate the hooks 11 of the chain, to the end that the pivoted sections or sides of the harrow may be moved to various positions and secured by these chains.

A clevis indicated at 17 is secured at the outer end of the beam and affords means whereby a suitable draft appliance may be coupled with the harrow.

It might be further stated that the usual handles which are indicated at 18, are supplied so that the harrow may be guided properly.

From the foregoing it will be seen that due to the construction shown and described, the harrow may be adjusted laterally providing a harrow of various widths and for accomplishing various results.

The beam 5 is cut away adjacent to the rear end thereof as indicated at 19 so that the teeth of the harrow will have a clearance at this point to permit them to move directly under the beam.

I claim:

A harrow including a beam, lateral harrow sections, each section embodying spaced front and rear bars having spaced openings formed therein and having their inner ends pivotally connected with the beam, end bars connecting the front and rear bars, the forward ends of the end bars extending appreciable distances beyond the front bars, a plate secured to the beam and having openings formed therein, chains connecting the forwardly extending ends of the end bars and plate to secure the harrow sections in various positions of adjustment, spring harrow teeth and bolts extending through the openings of the front and rear bars for adjustably securing the harrow teeth to the front and rear bars.

In testimony that I claim the foregoing as my own, I have hereto affixed my signature.

HENRY HEITMUELLER.